(No Model.)　　　　　　　　　　　　　　　　6 Sheets—Sheet 4.
J. W. FARNOFF.
COMBINED MEAT CHOPPER, MIXER, AND DISINTEGRATOR.
No. 554,021.　　　　　　　　　　　　Patented Feb. 4, 1896.
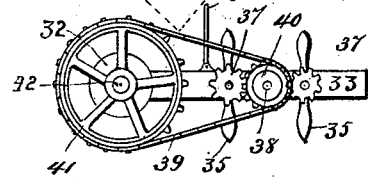

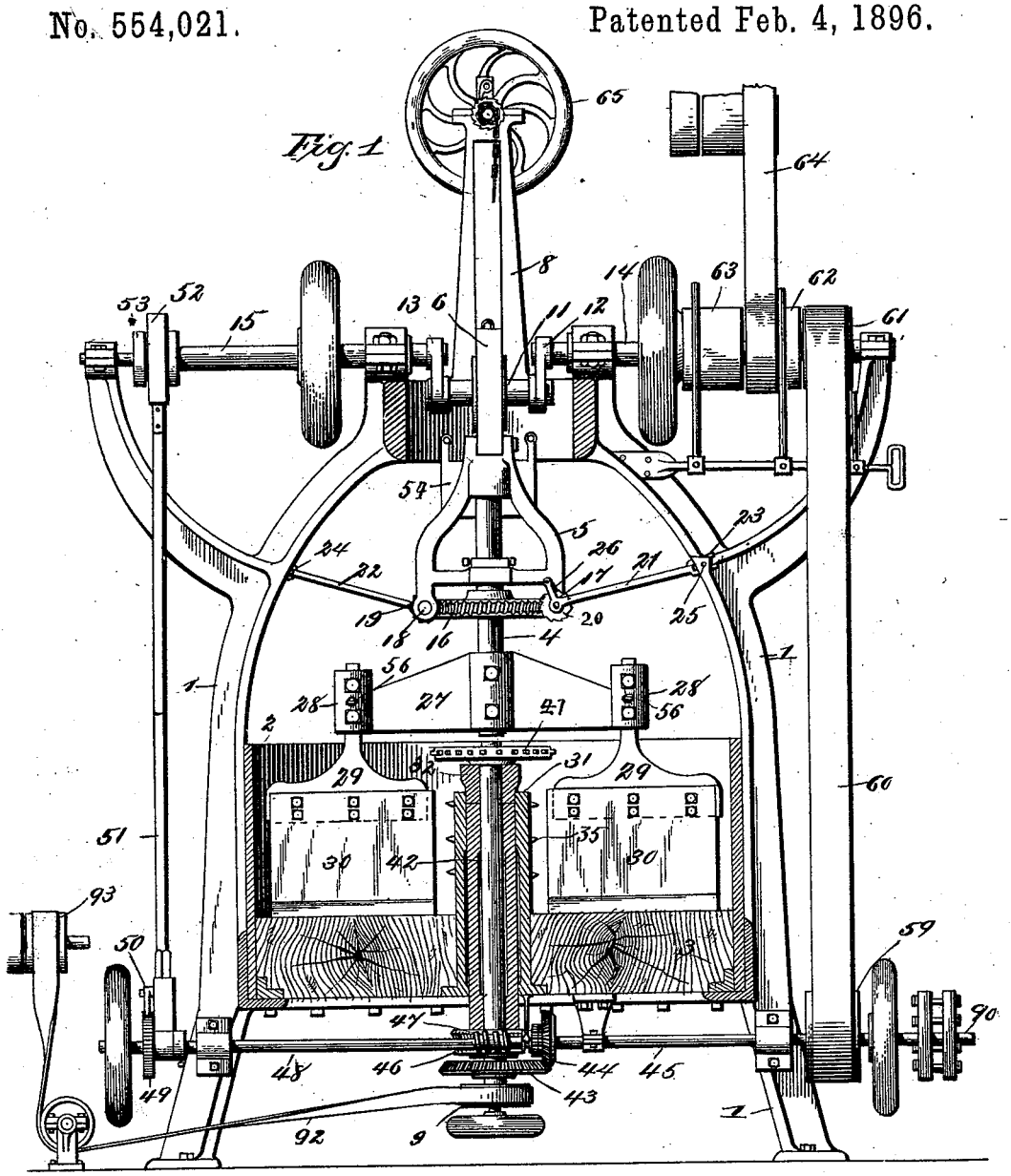

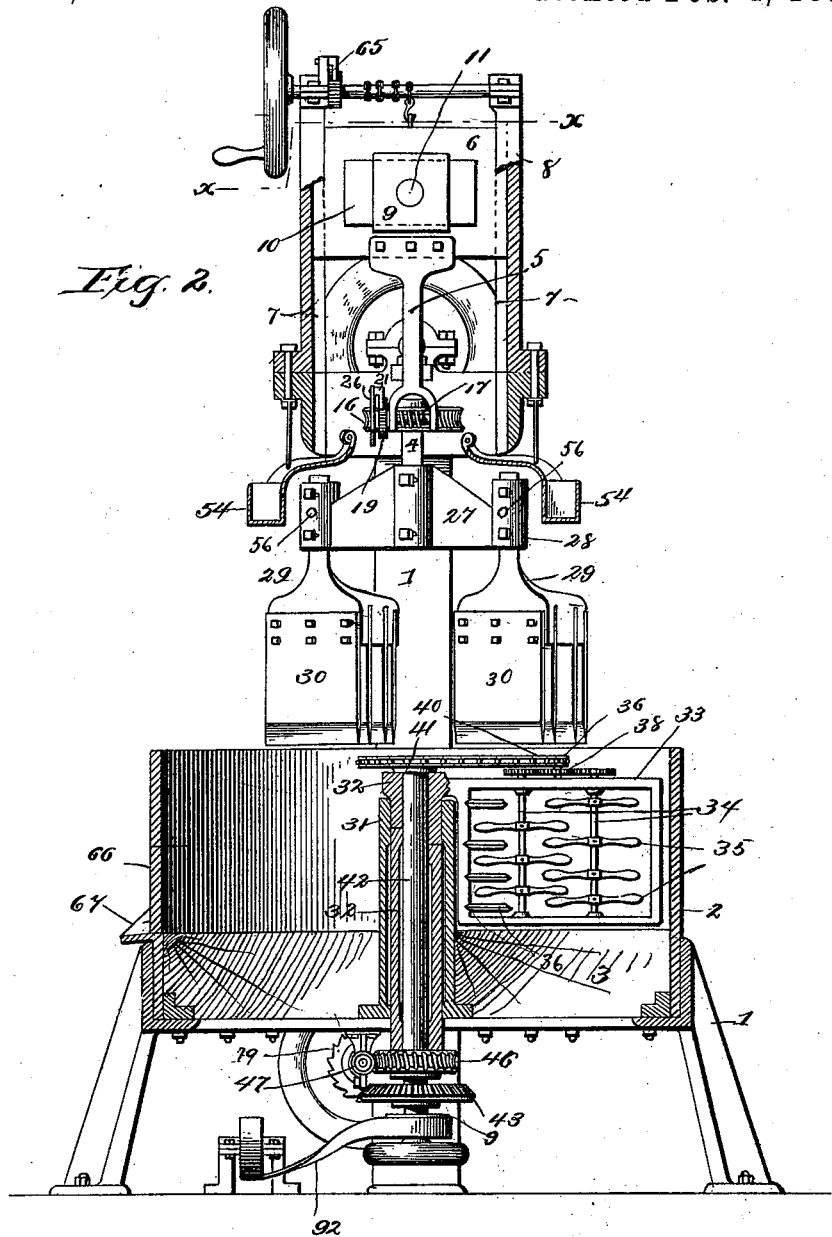

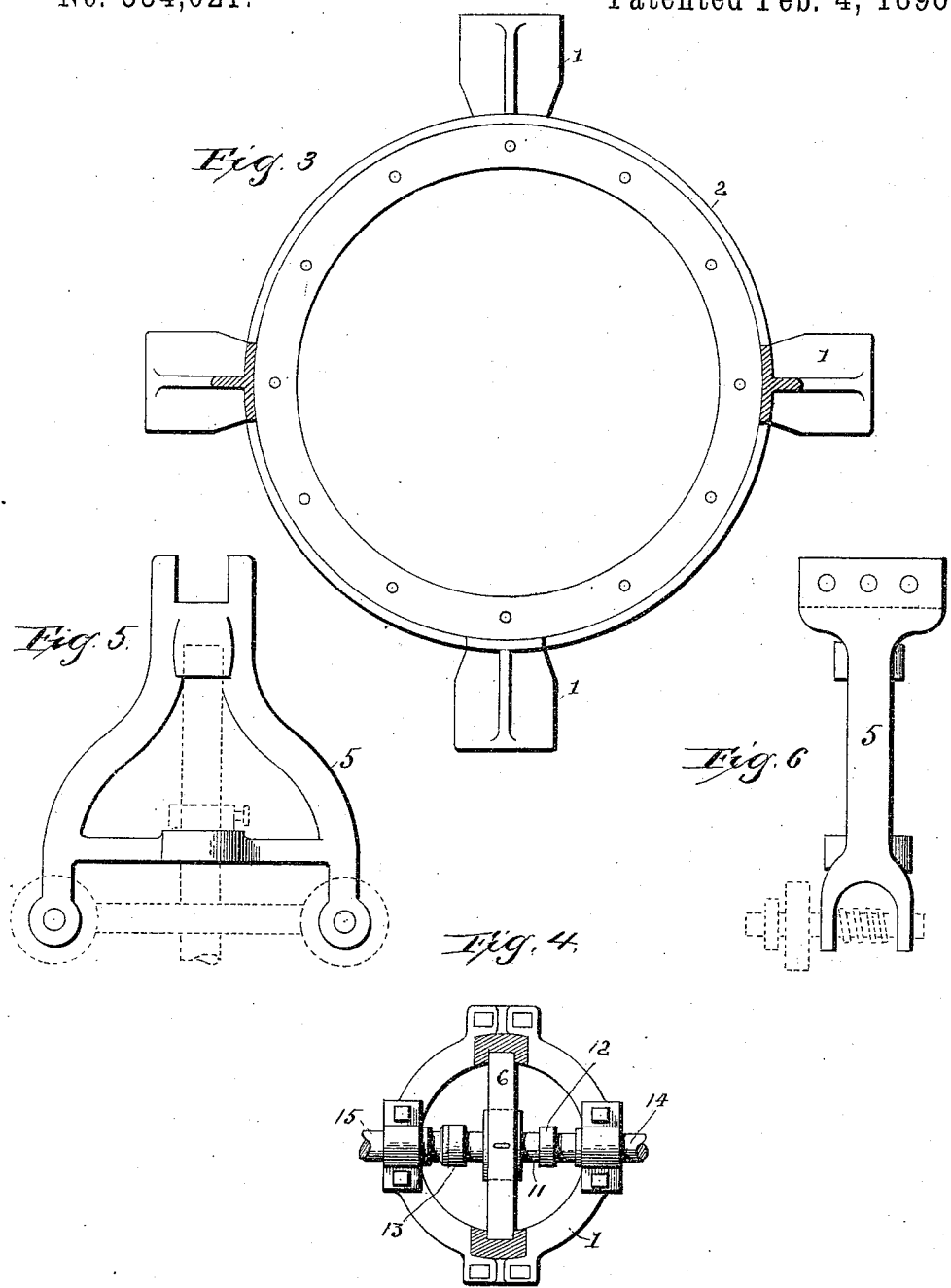

(No Model.)

J. W. FARNOFF.
COMBINED MEAT CHOPPER, MIXER, AND DISINTEGRATOR.

No. 554,021. Patented Feb. 4, 1896.

6 Sheets—Sheet 5.

Witnesses
E. C. Wurdeman
S. Williamson

Inventor
Jay W. Farnoff
By Geo. H. Holgate
his Attorney (No Model.) 6 Sheets—Sheet 6.
J. W. FARNOFF.
COMBINED MEAT CHOPPER, MIXER, AND DISINTEGRATOR.
No. 554,021. Patented Feb. 4, 1896.

Witnesses
F. M. Johnson
E. C. Wurdeman

Inventor
Jay W. Farnoff
By Geo. H. Holgate
his Attorney

UNITED STATES PATENT OFFICE.

JAY WILLIAM FARNOFF, OF BUFFALO, NEW YORK.

COMBINED MEAT CHOPPER, MIXER, AND DISINTEGRATOR.

SPECIFICATION forming part of Letters Patent No. 554,021, dated February 4, 1896.

Application filed April 13, 1895. Serial No. 545,620. (No model.)

*To all whom it may concern:*

Be it known that I, JAY WILLIAM FARNOFF, a citizen of the United States, residing at Buffalo, in the county of Erie and State of New York, have invented certain new and useful Improvements in a Combined Meat Chopper, Mixer, and Disintegrator, of which the following is a specification.

My invention relates to new and useful improvements in combined meat choppers, mixers, and disintegrators, and especially to that class known as "power-machines," and has for its object to so construct and organize such a machine as to greatly facilitate the process of preparing meat and the like; and with these ends in view my invention consists in certain details of construction and combination of elements hereinafter fully set forth, and then designated by the claims.

In order that those skilled in the art to which my invention appertains may understand how to make and use the same, I will proceed to describe its construction and operation in detail, referring by figure to the accompanying drawings, forming a part of this specification, in which—

Figure 9:
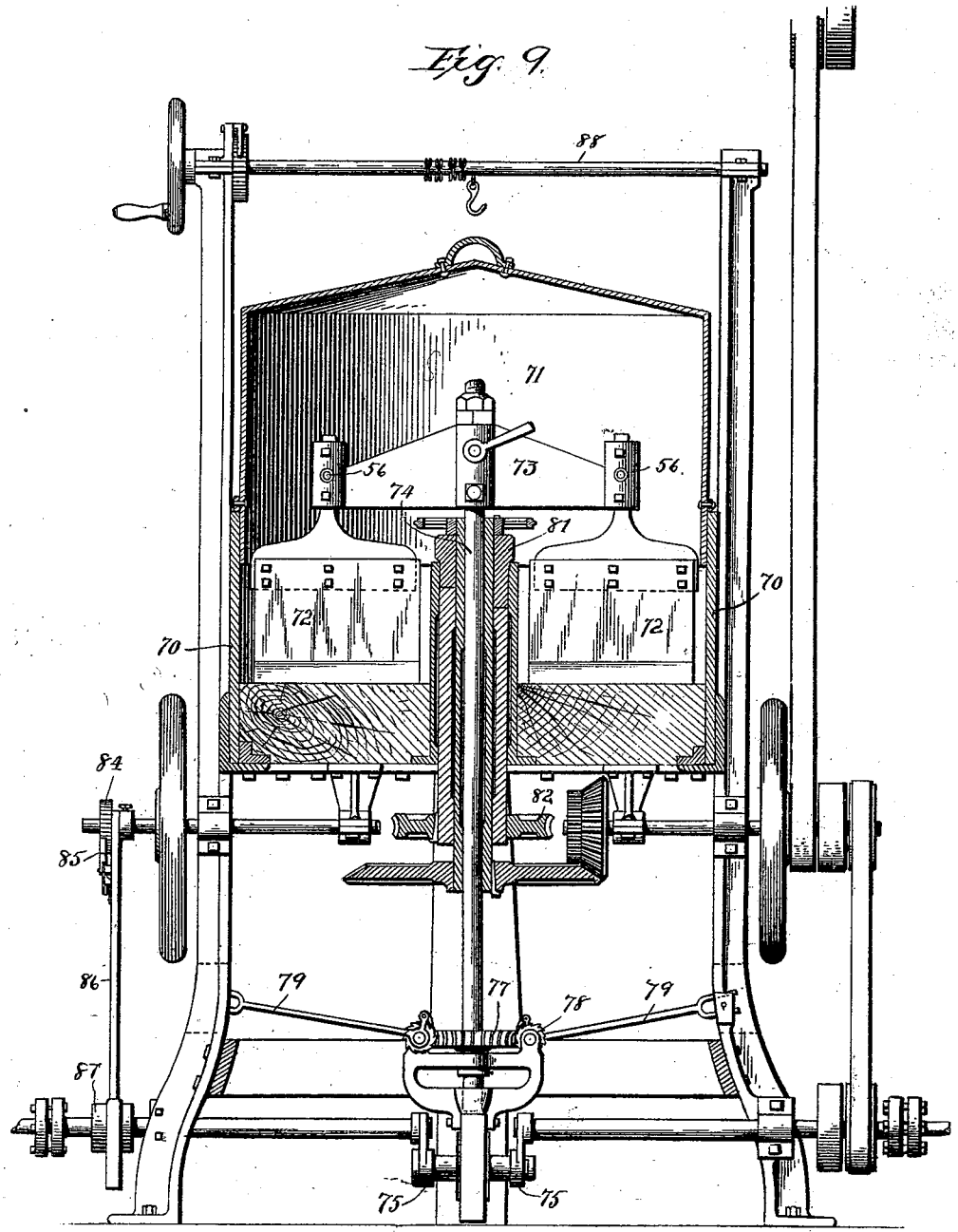
Figure 10:
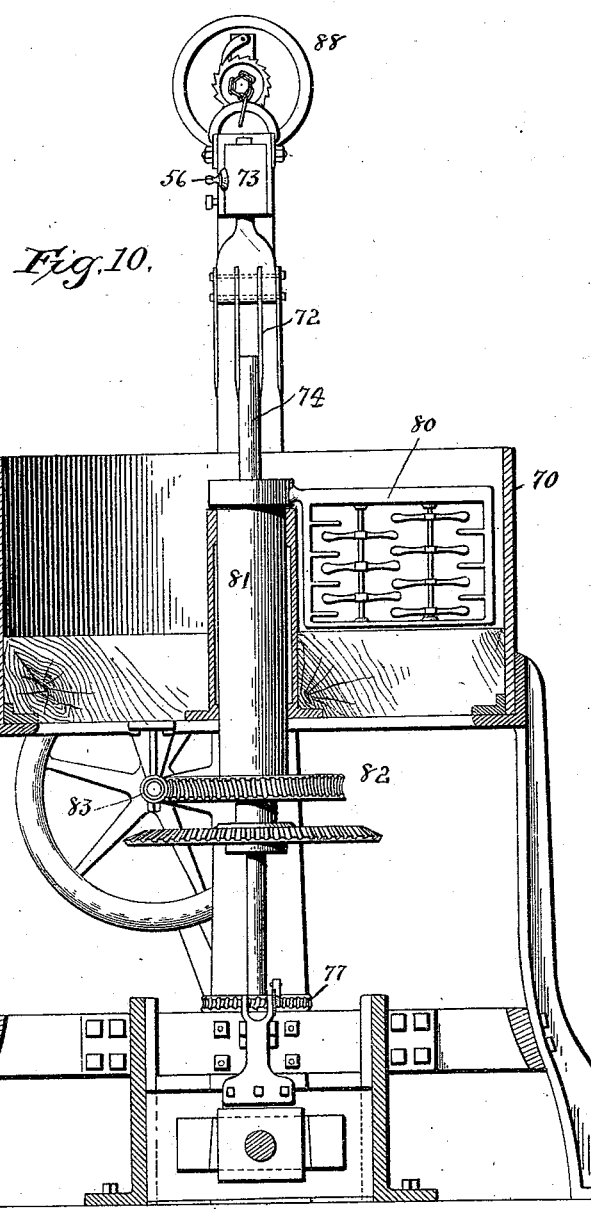

Figure 1 is a sectional elevation of my preferred construction, showing the knives in operative position. Fig. 2 is a similar view taken at right angles to Fig. 1, and showing the knives elevated and the mixer in elevation. Fig. 3 is a plan of the tank or hopper, the frame being in section; Fig. 4, a section taken at the line X X of Fig. 2, showing crank, shaft, and block in plan; Fig. 5, a side elevation of gear-carrier; Fig. 6, an end elevation of same; Fig. 7, a sectional plan view of mixer mechanism; Fig. 8, a plan view of the mixer-frame; Fig. 9, a vertical section of a modified form of my device; Fig. 10, a similar view taken at right angles to Fig. 9, and Fig. 11 a detailed section of a safety-bolt for retaining the knives.

Similar figures denote like parts in the several views of the drawings.

1 represents the frame of the machine, cast or otherwise formed in such shape as to advantageously support the operating parts.

2 is a hopper or tank fitted to the frame at the lower portion thereof and having as a bottom a block of wood or other suitable material 3.

4 is a shaft journaled within the reciprocating gear-frame 5, so as to have a rotary motion only, and the upper end of this frame 5 is bolted to a crank-frame 6, which latter is guided by and adapted to reciprocate in grooved ways 7, formed in the extension 8 of the frame of the machine.

9 is a crank-block fitted and adapted to slide longitudinally in the opening 10 within the crank-frame. Passing through this block is a crank-pin 11, which connects the cranks 12 and 13 in such manner as to cause them to operate in unison.

14 and 15 are power and eccentric shafts, respectively, on the inner ends of which are secured cranks 12 and 13, the eccentric-shaft 15 receiving its motion from power-shaft 14, through the crank-pin and cranks, for the purpose hereinafter explained.

Secured to the shaft 4 is a worm-wheel 16, with which mesh worms 17 and 18, having their bearings in the frame 5 and arranged on opposite sides of the wheel 16.

19 and 20 are ratchet-wheels secured on the same shafts with the worms and adapted to impart motion thereto.

21 and 22 are angle-levers, fitted concentric with the worm-shafts and having at the extremity of their long arms forks 23 and 24, which slide upon pins 25 secured in the frame of the machine. To the extremity of the short arms of these levers are pivoted pawls 26, which are adapted to engage with the ratchet-wheels and impart to them an intermittently-rotary movement when the frame 5 is reciprocated vertically.

To the lower end of the shaft 4 is bolted or otherwise secured a yoke, having formed at its extremities the sockets 28.

29 are knife-frames whose upper ends terminate in shanks adapted to fit into the sockets 28 and be secured by bolts and safety latchet-pins, which will be presently explained. To these frames are bolted the knives 30 in gangs of four or more, as shown in Fig. 2.

The operation of the above-described mechanism is obviously as follows: Power being applied to shaft 14, the shaft 4 will be caused to reciprocate vertically through the cranks and crank-pin, thus raising and lowering the knives in rapid succession against the block 3, so that meat or other material placed within the hopper and on said block will receive the action of the knives. By this vertical motion of the frame 5 the levers 21 and 22 will be caused to oscillate on their centers, thereby imparting to the ratchets 19 and 20 an intermittently step-by-step movement, which movement will be transmitted through the worms to the worm-wheel, and so to the shaft 4, whereby the yoke and the knives supported thereon will be caused to revolve about the center of the hopper one step at each reciprocation of the shaft 4, and this movement takes place on the upward movement of said shaft, so that the knives in their descent have no rotary movement.

From this it will be seen that all the meat or material within the hopper will be successively acted upon by the knives.

Secured within the hopper, at the center thereof, is a tubular bearing 31, in which is journaled a sleeve 32, and to the end of this sleeve is secured by clutch or other means a rectangular frame 33, which I designate the "mixer-frame." Within this frame are journaled short shafts 34, to which are secured blades 35. These blades are pitched similar to propeller-blades, and at such an angle as to cause the material in which they operate to have a general upward movement.

At the inner and outer edge of the frame 33 are secured stationary blades 36, between which the propeller-blades pass.

To the upper ends of the shafts 34 are secured gear-wheels 37, which mesh with an idle-wheel 38 on the opposite sides thereof. This will cause the propeller-blades to revolve in opposite directions, and as the said blades pass between each other they will thoroughly disintegrate the material acted upon.

39 is a sprocket or drive chain, connecting the sprocket-wheels 40 and 41, and through which motion is transmitted from the latter to the former, and as the sprocket-wheel 40 is secured to the idle-wheel 38 this motion will be imparted to the propeller-blades, as before described.

The sprocket-wheel 41 is secured to the top of the shaft 42, which latter is journaled within the sleeve 32 and carries at its lower end a beveled gear 43, which in turn meshes with the beveled pinion 44 carried by the shaft 45, which is journaled in suitable bearings. It therefore follows that when power is applied to the shaft 45 motion will be transmitted through the beveled pinion and gear to shaft 42, and from thence to the agitating propeller-blades, as before described.

To the end of the sleeve 32 is secured a worm-wheel 46, with which meshes the worm 47, carried by the shaft 48, journaled in suitable bearings.

49 is a ratchet-wheel secured to the shaft 48 near its outer end, and 50 is a pawl pivoted to the lever 51 and adapted to engage with and actuate said ratchet, for the purpose hereinafter explained.

The lever 51 is pivoted to the shaft 48 and held in position by the ratchet and a suitable collar. From thence it extends upward and terminates in a fork 52, which surrounds eccentric 53 carried by the shaft 15. As this shaft revolves an oscillating motion is imparted to the lever 51, which will cause the pawl 50 to actuate the ratchet step by step, and this motion will be transmitted through the worm and gear to the sleeve 32 and the agitator-frame carried thereby, so that it will be seen that when the machine is put in motion to operate the knives 30 the agitator-frame will be carried step by step in unison with the step-by-step rotation of the knives, and at the same time the agitator-blades will be caused to rapidly revolve, thus coming in contact with and thoroughly disintegrating all the material within the hopper.

54 are oil-cups bolted to the frame beneath the guideways, in which the crank-frame reciprocates, so as to catch any surplus oil that may drop from said guideways. This is very advantageous, as for such oil to drop into the hopper would be to contaminate and materially depreciate the meat therein.

55 is a wire guard placed at one side of the agitator-frame, so as to prevent injury to the agitator-blades in case the knives should become displaced, the relative position of said frame and knives being clearly shown in Fig. 7.

Within the walls of sockets 28 are arranged spring-actuated safety-pins 56. The ends of these pins are conical and adapted to fit into recesses formed in the shanks of the knife-frames 29, so as to secure them against accidental displacement, and at the same time facilitate their removal.

In the process of chopping, mixing, and disintegrating meat and like material, it is necessary, after the chopping process has been sufficiently performed, to still further act upon said material for the purpose of more thoroughly mixing and disintegrating the same. I have, therefore, so constructed my present device as to enable the operator to throw out of operation the chopping mechanism, and continue the mixing and disintegrating process in the same manner as when the knives were being operated. The mechanism for accomplishing this result will now be described.

On the inner extremity of the shaft 48 is arranged a gear-wheel 57, in such manner as to slide thereon and is controlled by ordinary lever and collar mechanism, whereby its position on its shaft is determined. Cast with or secured to the beveled pinion 44 is a gear-wheel 58, adapted to be engaged by and mesh with the gear-wheel 57.

59 is a pulley secured on shaft 45, and receives its motion from belt 60, which in turn gets its motion from the tight pulley 61, secured on the pulley-shaft 14, and in juxtaposition thereto is a loose pulley 62, and secured to said shaft on the opposite side of the latter pulley is a tight pulley 63.

Assuming that power is transmitted to the machine through the belt 64, when it is desired to throw the knives out of operation it will only be necessary to remove the crank-pin 11 and elevate the gear-frame 5, with the shaft-yoke and knives supported thereby, by means of the windlass 65, as shown in Fig. 2, when by shifting belts 60 and 64 onto the loose pulley 62 and putting gear 57 into mesh with gear 58 and disengaging pawl 50 from its ratchet motion will be transmitted through belt 60, shaft 45, beveled gears 43 and 44 to shaft 42, and from thence to the disintegrator-blades, as before described, and through gears 57 and 58, worm 46, worm-wheel 43 to the sleeve 32, thus causing the disintegrator-frame 33 to have a slow but steady rotation about its center within the hopper, which in connection with the rapid revolutions of the disintegrator-blades will complete the mixing and disintegrating process.

In order to facilitate the washing and flushing of the block, I provide a door 66 in the side of the hopper and a spout 67, so that the egress of the water during this process will be directed to a pail or other receptacle.

It is obvious that slight modifications may be made in the foregoing-described construction without departing from my invention, and in Figs. 9 and 10 I have shown a slight modification thereof, the essential features of which will now be described. In these figures the hopper is designated 70, and is arranged above the operating mechanism and provided with a cover 71, whereby the hopper is completely closed during the chopping of the meat, and the knives 72 are supported by their yoke 73 and operated through shaft 74, which is caused to reciprocate vertically by the cranks 75 and gear-frame 76, in a similar manner as that hereinbefore described.

The intermittent rotation of the knives is effected by the worm-wheel 77 and worms 78, which in turn are actuated by the right-angle levers 79 and their pawls. The disintegrator-blades and frame 80 are mounted upon the sleeve 81, which is moved step by step through the worm-wheel 82 and worm 83, which latter gets its motion from the ratchet 84, pawl 85, lever 86, and eccentric 87. The knives and their frame may be elevated by the windlass 88, as shown in Fig. 10.

In practice I have sometimes found it advantageous to apply power directly to the lower shaft, and for this purpose I have shown said shaft coupled directly to an engine-shaft 90, and also in arranging a number of machines in gang the space is economized by transmitting power from one machine to another, and this I accomplish by securing the pulley 91 to the lower end of the shaft 42 and belting from thence to shaft 93, and so to the next machine.

Having thus fully described my invention, what I claim as new is—

1. In a combined meat chopper, mixer and disintegrator, the vertically-reciprocating and intermittently-rotating frame carrying cutters, in combination with an independent, intermittently or direct rotating frame provided with two or more direct disintegrators and mixers, provided with various-shaped blades.

2. In a combined meat chopper, mixer and disintegrator, vertically-reciprocating and intermittently-rotating knives and mechanism for actuating the same, in combination with an intermittently-revolving frame carrying rapidly-revolving disintegrating-blades and mechanism for operating the same, said frame adapted to rotate in unison with the knives, as and for the purpose set forth.

3. In a device as described, vertically-reciprocating and intermittently-revolving knives and mechanism for actuating the same, in combination with an intermittently-revolving frame carrying two sets of blades revolving in opposite directions and mechanism—such as gears, sprocket chain and wheels for imparting motion to said blades—and means for throwing out of operation the knives and continuing the mixing and disintegrating process, substantially as shown and for the purpose set forth.

4. In a machine of the character described, an intermittently-revolving frame supported by a central sleeve, said sleeve being revolved by means of the worm-gear and worm, which latter is actuated by ratchet mechanism, in combination with a shaft passing through the center of said sleeve, the disintegrator-blades adapted to be revolved by said shaft through suitable gearing, and means for imparting a revolving motion to said shaft, substantially as shown and described.

5. In a machine of the character described, an intermittently-revolving frame supported by a central sleeve, a worm-gear for revolving the sleeve, vertically-reciprocating and intermittently-revolving knives, means for disengaging the frame from the operating mechanism, and a windlass adapted to elevate said frame and knives without the field of action of the disintegrator, as and for the purpose described.

6. In a machine of the character described, an intermittently-rotating and rapidly-revolving disintegrator, and mechanism for changing said intermittent motion, in combination with vertically-reciprocating and intermittently-revolving knives, and frame for supporting the same, means for disengaging said frame from the operating mechanism of the machine and a windlass adapted to elevate said frame and knives without the field of action of the disintegrator, as and for the purpose set forth.

7. In a machine of the character described, consisting of an intermittently rotating and revolving disintegrator, chopping mechanism and a hopper adapted to contain the meat to be chopped and in which said mechanisms operate, in combination with a cover for closing said hopper and a spout by which the contents of said hopper may be directed to a receptacle, as and for the purpose set forth.

In testimony whereof I have hereunto affixed my signature in the presence of two subscribing witnesses.

JAY WILLIAM FARNOFF.

Witnesses:
WILLIAM STILLINGER,
CHARLES WHEIMHERMS.